United States Patent [19]

Yamamoto et al.

[11] Patent Number: 4,956,445

[45] Date of Patent: Sep. 11, 1990

[54] PROCESS FOR THE PREPARATION OF ACETAL POLYMER OR COPOLYMER

[75] Inventors: Kaoru Yamamoto; Hiroyuki Sano; Shuichi Chino, all of Fuji, Japan

[73] Assignee: Polyplastics Co., Ltd., Osaka, Japan

[21] Appl. No.: 283,433

[22] Filed: Dec. 12, 1988

[30] Foreign Application Priority Data

Dec. 25, 1987 [JP] Japan ................................. 62-392240

[51] Int. Cl.$^5$ ............................................. C08G 2/10
[52] U.S. Cl. ................................... 528/230; 528/234; 528/235; 528/237; 528/241; 528/242; 528/245; 528/249; 528/250; 528/270; 528/392
[58] Field of Search ............... 528/230, 234, 235, 237, 528/241, 242, 245, 249, 250, 270, 392

[56] References Cited

U.S. PATENT DOCUMENTS

| | | | |
|---|---|---|---|
| 4,568,775 | 2/1986 | Aoshima et al. | 568/617 |
| 4,658,065 | 4/1987 | Aoshima et al. | 564/487 |
| 4,792,627 | 12/1988 | Aoshima et al. | 564/487 |

FOREIGN PATENT DOCUMENTS 61-143428  1/1986  Japan.
61-126134  6/1986  Japan.

Primary Examiner—John Kight, III
Assistant Examiner—Sam A. Acquah
Attorney, Agent, or Firm—Nixon & Vanderhye

[57] ABSTRACT

Acetal polymer having a high degree of polymerization is obtained using a catalyst of a heteropoly acid or an acid salt thereof in a small amount. The catalyst is represented by formula:

$$H_x[M_m \cdot M'_n O_l] y H_2 O \qquad (1)$$

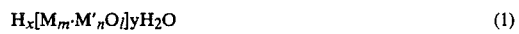

wherein

M: a central element constituted of at least one member selected from among P, B, Si, Ge, Sn, As, Sb, U, Mn, Re, Cu, Ni, Ti, Co, Fe, Cr, Th and Ce, M': at least one ligand element selected from among W, Mo, V and Nb, m: 1 to 10, n: 6 to 40, l: 10 to 100, x: an integer of 1 or above, and y: 0 to 50.

6 Claims, No Drawings

PROCESS FOR THE PREPARATION OF ACETAL POLYMER OR COPOLYMER

FIELD OF INVENTION

The present invention relates to a process for the preparation of an acetal polymer or copolymer.

More particularly, the present invention relates to a novel process for the preparation of an acetal polymer or copolymer which comprises polymerizing formaldehyde or a cyclic oligomer thereof as a principal monomer, the invention being especially characterized by the use of a heteropoly acid or an acid salt thereof as a catalyst.

BACKGROUND AND SUMMARY OF THE INVENTION

Oxyalkylene polymers, particularly oxymethylene polymers having repeating oxymethylene units (i.e., $-CH_2O-$ are well known. Known polymerization processes for the preparation of oxyalkylene polymers are broadly classified into two processing techniques. One such process technique including polymerizing anhydrous formaldehyde as a principal monomer, while the other process technique including polymerizing, as a principal monomer, a cyclic acetal, such as trioxane (a cyclic trimer of formaldehyde).

With respect to the former processing technique, it has been proposed to (co)polymerize substantially anhydrous formaldehyde in the presence of an anionic or cationic catalyst. With respect to the latter processing technique, it has been proposed to carry out the (co)polymerization of a cyclic acetal (such as trioxane) as a principal monomer in the presence of a cationic catalyst. Examples of the catalysts which have been proposed include Lewis acids such as halides of boron, tin, titanium, phosphorus, arsenic and antimony, particularly, boron trifluoride, tin tetrachloride, titanium tetrachloride, phosphorus pentachloride, phosphorus pentafluoride, arsenic pentafluoride, antimony pentafluoride and complex compounds and salts thereof; protonic acids such as perchloric acid; protonic acid esters such as esters of perchloric acid with lower aliphatic alcohols, particularly t-butyl perchlorate; protonic acid anhydrides, particularly mixed acid anhydrides of perchloric acid will lower aliphatic carboxylic acids, such as acetyl perchlorate; trimethyloxonium hexafluorophosphate, triphenylmethyl hexafluoroarsenate, acetyl tetrafluoroborate, acetyl hexafluorophosphate and acetyl hexafluoroarsenate. Among them, boron fluoride and coordination compounds thereof with an organic compound such as an ether are most generally used as a catalyst for (co)polymerizing a cyclic oligomer of formaldehyde such as trioxane as a principal monomer and are frequently used in the (co)polymerization on an industrial scale. However, the (co)polymer prepared by the use of any of known catalysts as described above is limited in the degree of that is obtained. Thus, it is difficult according to conventional processes to obtain a (co)polymer having a degree of polymerization exceeding a certain limit by the use of the catalysts noted previously.

Furthermore, when a cyclic ether or formal having at least two adjacent carbon atoms is copolymerized with formaldehyde or a cyclic oligomer thereof by the process of the prior art for the purpose of introducing a stable unit into an acetal polymer, as copolymer generally contains a thermally unstable moiety at the terminal ends of its molecule. The copolymer must therefore be stabilized by eliminating the unstable moiety in order for it to be useable. The elimination of unstable moieties necessitates complicated post-treatment which consumes energy, and is thus uneconomical. On the other hand if the as-produced crude acetal copolymer copolymerization contains only a reduced amount of an unstable moiety, the resulting final product will exhibit improved stability thereby simplifying its post-treatment. Accordingly, the development of a polymerization process by which an acetal copolymer containing a reduced amount of unstable moiety can be prepared has been needed.

The cause of the above problems (i.e., a polymer or copolymer having a limited degree of polymerization and/or a significant amount of unstable ends is presumably that a) the known polymerization catalysts as described above not only accelerate the (co)polymerization, but also participate in the decomposition and depolymerization of the produced (co)polymer. Thus, the acetal (co)polymer prepared by the use of such a catalyst exhibits molecular weight, thermal stability, moldability and color which vary depending upon the specific type of the catalyst. In view of these problems, the present invention has been made and is based upon the discovery of a polymerization catalyst which overcomes the above noted problems.

The present invention broadly relates to a process for the preparation of an acetal polymer or copolymer which comprises polymerizing formaldehyde or a cyclic oligomer thereof alone, or copolymerizing it as a principal monomer with a comonomer copolymerizable therewith, and is especially characterized by the use of a heteropoly acid or an acid salt thereof as a polymerization catalyst.

DESCRIPTION OF THE PREFERRED EMBODIMENTS

According to the present invention, an acetal polymer or copolymer can be obtained in an enhanced yield and with an enhanced the molecular weight as compared to acetal (co)polymers according to the prior art, even if the amount of catalyst is used. Particularly, when an acetal copolymer is prepared according to the present invention, the obtained copolymer contains only a reduced amount of unstable moiety, so that the final product obtained by subjecting the copolymer to post-treatment also exhibits excellent stability. Moreover the post-treatment itself can be simplified. Thus, the process of the present invention is advantageous from an economic viewpoint.

In the present invention, a heteropoly acid or an acid salt thereof is used as a polymerization catalyst. In this regard, it is believed that neither the use of a heteropoly acid or acid salt as a polymerization catalyst nor its application to the preparation of an oxymethylene polymer has been proposed. According to the present invention, by using such a polymerization catalyst, the polymerization of formaldehyde or a cyclic oligomer such as trioxane, or the copolymerization thereof with a comonomer copolymerizable therewith, can be carried out more easily than processes according to the prior art; even if the amount of the catalyst used is very small. Further, according to the present invention, it is possible to prepare an acetal (co)polymer having a degree of polymerization higher than that polymers prepared by the processes of the prior art. It is also now possible to prepare an acetal copolymer having a reduced amount of unstable ends. For these advantageous characteristics, the acetal (co)polymer prepared by the process of the present invention can be utilized in specific fields which are unsuitable for (co)polymers prepared using the catalyst of the prior art. Thus, the present invention provides an acetal (co)polymer which can be utilized in more diverse fields of application.

The "heteropoly acid" as a polymerization catalyst, by which the present invention is characterized, is a generic term for poly acids formed by the condensation of different kinds of oxoacids through dehydration and contains a mono- or poly-nuclear complex ion wherein a hetero element is present in the center and the oxo acid residues are condensed through oxygen atoms. Such a heteropoly acid is generally represented by the general formula:

$$H_x[H_m \cdot M'_n O_l] y H_2O \quad (1)$$

wherein
M: central element,
M': ligand element,
O: oxygen atom,
H: hydrogen atom,
H$_2$O: water of crystallization,
$1 \leq m \leq 10$,
$6 \leq n \leq 40$,
$10 \leq l \leq 100$,
$1 \leq x$,
and $0 \leq y \leq 50$.

The central element (M) in the above formula is constituted of one or more members selected from among P, B, Si, Ge, Sn, As, Sb, U, Mn, Re, Cu, Ni, Ti, Co, Fe, Ce, Th and Cr, among which P or Si is particularly preferable. The ligand element (M') is generally at least one element selected from among W, Mo, V and Nb, among which W or Mo is particularly preferred.

According to the present invention, it is possible to use acid salts of the above heteropoly acids corresponding to the compounds obtained by replacing all or part of the x H atoms in the formula (1) with various metals etc.

Particular examples of the heteropoly acid include molybdophosphoric acid, tungstophosphoric acid, molbdotungstophosphoric acid, molybdovanadophosphoric acid, molybdotungstovanadophosphoric acid, tungstovanadophosphoric acid, molybdoniobophosphoric acid, tungstosilicic acid, molbdosilicic acid, molybdotungstosilicic acid, molybdotungstovanadosilicic acid, tungstogermanic acid, tungstoboric acid, molybdoboric acid, molybdotungstoboric acid, molybdovanadoboric acid, molybdotungstovanadoboric acid, molybdocobaltic acid, tungstocobaltic acid, molybdoarsenic acid and tungstoarsenic acid, among which molybdosilicic acid, tungstosilicic acid, molbdophosphoric acid and tungstophosphoric acid are preferred.

The amount of the heteropoly acid or acid salt thereof to be used as a catalyst for the polymerization of a monomer component comprising formaldehyde or a cyclic oligomer thereof such as trioxane as a principal monomer is generally 0.1 to 5000 ppm, preferably 0.2 to 50 ppm based on the total amount of the monomer component, though it varies depending upon the specific the catalyst used, and/or may be suitably varied to control polymerization. When a heteropoly acid having a very high activity, for example, molybdophosphoric acid is used as a catalyst, the amount thereof is satisfactorily 0.2 to 10 ppm. The fact that the (co)polymerization can be carried out even by the use of such a small amount of a catalyst is effective in inhibiting undesired reactions such as catalyst-activated cleavage of the main chain or polymer depolymerization and is therefore economically advantageous.

According to the present invention, it is preferable to add a heteropoly acid in a state whereby it is diluted with an inert solvent which does not adversely affect the polymerization of formaldehyde or a cyclic oligomer thereof and to thereby perform polymerization in a homogeneous system. The inert solvent includes ethers which are organic, solvents in which a heteropoly acid is soluble, with n-butyl ether being preferred.

The principal monomer to be used in the present invention is anhydrous formaldehyde or a cyclic oligomer thereof. Representative examples of the latter include trioxane which is a cyclic trimer of formaldehyde and tetraoxane which is a tetramer thereof. Particularly, trioxane is the most suitable principal monomer either in homopolymerization or in copolymerization.

The process of the present invention is particularly useful for the copolymerization of formaldehyde or a cyclic oligomer thereof as a principal monomer with a comonomer copolymerizable therewith, though it is also useful for the homopolymerization of formaldehyde or a cyclic oligomer thereof Further, the process of the present invention is useful not only for the copolymerization of formaldehyde or its cyclic oligomer such as trioxane with only one comonomer, but also for the copolymerization thereof with two or more comonomers. The comonomer includes those which give copolymers having a branched or crosslinked structure. Representative examples of the comonomer include compounds represented by the general formula (2):

wherein R$_1$, R$_2$, R$_3$ and R$_4$ may be the same or different and each stand for a hydrogen atom or an alkyl or halogen-substituted alkyl group; R$_5$ stands for a methylene or oxymethylene group, an alkyl- or halogenoalkyl-substituted methylene or oxymethylene group (in this case, p is an integer of 0 to 3) or a divalent group of —(CH$_2$)$_q$OCH$_2$— or —O—CH$_2$—CH$_2$)$_q$OCH$_2$— (wherein p is 1 and q is an integer of 1 to 4). The alkyl group has 1 to 5 carbon atoms and 1 to 3 hydrogen atoms thereof may be replaced with halogen atoms, particularly chlorine atoms. Particular examples thereof include epichlorohydrin, ethylene oxide, 1,3-dioxolane, diethylene glycol formal, 1,4-butanediol formal, 1,3-dioxane and propylene oxide. Further, cyclic esters such as β-propiolactone and vinyl compounds such as styrene and acrylonitrile may be used as the above comonomer. Furthermore, the comonomer which gives a copolymer having a branched or crosslinked structure include alkyl mono-(or di-)glycidyl ethers (or formals) such as methyl glycidyl formal, ethyl glycidyl formal, propyl glycidyl formal, butyl glycidyl formal, ethylene glycol glycidyl ether, triethylene glycol diglycidyl ether and bis(1,2,6-hexanetriol)triformal. Particularly, the catalyst according to the present invention is more effective in copolymerizing trioxane as a principal monomer with a cyclic ether or formal such as ethylene oxide, dioxolane or 1,4-butanediol formal.

In the process of the present invention, it is possible to use a conventional chain transfer agent such as a low-molecular weight linear acetal in order to adjust the degree of polymerization in accordance with the object.

The process of the present invention can be carried out using equipment conventionally used for the polymerization of formaldehyde or tioxane according to the prior art. Namely, the process of the present invention may be carried out by either by batch-wise or continuous processing techniques and may be applied to solution polymerization, melt polymerization, melt bulk polymerization and solid phase polymerization. Preferably a liquid monomer is polymerized to obtain a polymer in a solid powder or lump form as polymerization progresses. In this process, if necessary, an inert liquid medium may be simultaneously used.

When the process of the present invention is carried out batch-wise, the equipment may be any conventional reactor fitted with a stirrer. When the process is carried out continuously, the equipment includes a Ko-kneader, continuous extrusion mixers of the twin-screw type, continuous mixers of the twin-paddle type, or other continuous polymerization equipment which have been proposed for the polymerization of trioxane or the like.

The polymerization temperature may not depending upon the polymerization process or the kind of monomer used. When trioxane is polymerized as a principal monomer by a conventional bulk polymerization technique, the polymerization temperature may be 64° to 120° C. Although the polymerization time is not particularly limited, it varies depending upon the amount of the catalyst used and is generally selected in the range of 0.5 to 100 minutes. After the lapse of a predetermined time, the formed polymer is drawn from the exit of the reactor generally as lump or powder, rid of part or the whole of any unreacted monomer and then fed into a following step. It is preferable to treat the reaction system after the completion of the polymerization by the addition of a conventional deactivator or a solution thereof to carry out neutralization and deactivation of the catalyst, using deactivators including ammonia; amines such as triethylamine and tri-n-butylamine; hydroxides of alkali metals or alkaline earth metals and other known deactivators. When the obtained polymer is in the form of a large solid lump, the deactivation treatment is preferably carried out after the lump has been ground.

The polymer thus obtained is generally subjected to stabilization treatment. When the obtained polymer is a homopolymer of formaldehyde or a cyclic oligomer thereof, the stabilization is attained by converting the ends thereof into ester, ether or urethane groups to thereby block them, while when the obtained polymer is a copolymer thereof, the stabilization is attained by thermally melting the copolymer or heating the copolymer in a medium in which the copolymer is soluble or insoluble to thereby selectively decompose and eliminate the unstable moiety. Particularly, a copolymer of formaldehyde or a cyclic oligomer thereof prepared according to the process of the present invention contains only a reduced amount of an unstable moiety even just after the completion of the polymerization, as compared with the copolymer prepared according to the process of the prior art, so that the stabilization thereof can be remarkably simplified and the final product is improved in stability.

EXAMPLES

Examples of the present invention will now be described, though it is to be understood that the invention is not to be limited thereby.

The terminology and methods of measurement used in the following Examples and Comparative Examples are as follows:

% and ppm: all by weight.

Yield: percentage (by weight) of the amount of the obtained polymer based on the total amount of the monomers fed.

Solution viscosity (reduced viscosity)

determined by using a solution of 0.25 g of a polymer in 50 g of a 2% solution of α-pinene in p-chlorophenol at 60° C. (evaluated as a characteristic value dependent upon the molecular weight).

Melt index (MI)

The melt index (g/10 min) measured at 190° C. is shown. It was evaluated as a characteristic value dependent upon the molecular weight. That is, the lower the melt index, the higher the molecular weight (in order to inhibit the decomposition during the measurement, a small amount of a predetermined antioxidant was added prior to the measurement).

Degree of decomposition with alkali (content of unstable moieties)

1 g of a copolymer is added to 100 ml of a 0.5% solution of ammonium hydroxide in 50% aqueous methanol. The obtained mixture was placed in a closed vessel and heated at 180° C. for 45 minutes to determine the amount of the formaldehyde extracted with the liquid medium. The amount is shown by percentage based on the polymer.

Weight loss on heating 5 g of a copolymer was ground and mixed with a powdery stabilizer mixture comprising 2,2'-methylenebis(4-methyl-6-t-butylphenol) (0.5% by weight) and dicyandiamide (0.1%). The obtained mixture was heated in air at 220° C. for 45 minutes to determine the weight loss.

EXAMPLE 1 AND COMPARATIVE EXAMPLE 1

200 ml of a solution of 0.04 g of molybdophosphoric acid in n-butyl ether was fed into a 500-ml separable flask fitted with a gas inlet tube and a stirrer. Pure formaldehyde gas which had been prepared by the thermal decomposition of α-polyoxymethylene at 180° C. and had been passed through a trap of −19° C. was blown into the flask at a rate of 0.35 g/min through the gas inlet tube, while blowing helium gas into the flask through the tube as a carrier gas at a rate of 50 ml/min. A powdery polymer was immediately formed. After 120 minutes from the initiation of the feeding of formaldehyde, the generated powdery polymer was taken out, washed with acetone, dried and examined for yield and reduced viscosity. The results are shown in Table 1.

The same procedure as that described above was repeated except that the molybdophosphoric acid was replaced with 0.13 g of boron trifluoride dibutyl etherate. The results are shown in Table 1.

TABLE 1

| | Polymerization catalyst | Concentration of catalyst g/l | Yield (%) | Reduced viscosity (dl/g) |
|---|---|---|---|---|
| Example 1 | molybdophosphoric acid | 0.20 | 78 | 1.75 |
| Comp. Ex. 1 | BF₃ dibutyl etherate | 0.65 | 75 | 1.32 |

EXAMPLES 2 AND 3 AND COMPARATIVE EXAMPLE 2

200 g of trioxane was fed into a closed autoclave fitted with a jacket for passing a heating medium and agitating blades and stirred therein, while passing hot water through the jacket to thereby keep the temperature of the contents at about 70° C. A catalyst solution given in Table 2 (a n-butyl ether solution for a heteropoly acid and a cyclohexane solution for boron trifluoride dibutyl etherate) was fed into the autoclave in such an amount as to give a catalyst concentration (based on monomer) given in Table 2. Thus, the polymerization was initiated. After 3 minutes, 300 g of a 0.1% aqueous solution of tributylamine was added to the autoclave to stop the polymerization. The contents were taken out, ground into 200-mesh or smaller particles, washed with acetone, dried and examined for yield and reduced viscosity. The results are shown in Table 2.

EXAMPLES 4 AND 10 AND COMPARATIVE EXAMPLE 3

The same polymerization and post-treatment as those described in Example 2 were repeated, except that the trioxane monomer was replaced with a monomer component comprising trioxane and 3.3% of 1,3-dioxolane and that a heteropoly acid (Examples) given in Table 3 or boron trifluoride dibutyl etherate (Comp. Ex.) was added as a catalyst in such an amount as to give a concentration given in Table 3. The characteristics of the polymers thus obtained are shown in Table 3. It can be understood from the results shown in Table 3 that the use of a heteropoly acid catalyst gives a high yield, even if the amount thereof is very small, and the polymer prepared by using the catalyst has an enhanced molecular weight and is excellent in resistance to alkali or heat.

EXAMPLE 11 AND COMPARATIVE EXAMPLE 4

The same polymerization and post-treatment as those described in Example 4 were repeated except that the 1,3-dioxolane (comonomer) was replaced with 1,4-butanediol formal. As Comparative Example, the same procedure as that described above was repeated except that boron trifluoride dibutyl etherate was used as a catalyst. The results are shown in Table 3. The results obtained in Example 11 and Comparative Example 4 were similar to those obtained in the above-mentioned Examples and Comparative Examples, respectively.

TABLE 3

| | Polymerization catalyst | Concentration* of catalyst (ppm) | Comonomer | Yield (%) | MI (g/10 min) | Degree of decomposition with alkali (%) | Weight loss on heating (%) |
|---|---|---|---|---|---|---|---|
| Example 4 | molybdophosphoric acid | 2 | 1,3-dioxolane | 72 | 5.4 | 4.5 | 4.6 |
| Example 5 | " | 4 | " | 78 | 5.9 | 4.7 | 4.8 |
| Example 6 | tungstosilicic acid | 2 | " | 71 | 5.5 | 4.6 | 4.7 |
| Example 7 | " | 4 | " | 76 | 6.0 | 4.7 | 4.9 |
| Example 8 | molybdosilicic acid | 3 | " | 74 | 6.0 | 4.6 | 4.7 |
| Example 9 | tungstophosphoric acid | 8 | " | 76 | 6.2 | 4.8 | 4.9 |
| Example 10 | vanadosilicic acid | 10 | " | 69 | 6.3 | 4.8 | 4.9 |
| Comp. Ex. 3 | boron trifluoride dibutyl | 40 | " | 65 | 8.1 | 7.2 | 7.4 |
| Example 11 | molybdophosphoric acid | 2 | 1,4-butane diol formal | 70 | 5.5 | 4.6 | 4.8 |
| Comp. Ex. 4 | boron trifluoride dibutyl ether complex | 40 (in terms of BF₃) | 1,4-butane diol formal | 63 | 8.3 | 7.4 | 7.6 |

*based on trioxane

TABLE 2

| | Polymerization catalyst | Concentration* of catalyst (ppm) | Yield (%) | Reduced viscosity (dl/g) |
|---|---|---|---|---|
| Example 2 | molybdophosphoric acid | 2 | 70 | 2.02 |
| Example 3 | tungstosilicic acid | 2 | 68 | 1.98 |
| Comp. Ex. 2 | boron trifluoride dibutyl etherate | 40 (in terms of BF₃) | 64 | 1.80 |

*based on the total amount of monomers

It can be understood from the results shown in Tables 1 and 2 that the use of a heteropoly acid catalyst gives an enhanced yield as compared with that of boron trifluoride dibutyl etherate catalyst according to the prior art, even if the amount of the catalyst is very small, and the polymer prepared by the process of the present invention has an enhanced molecular weight.

EXAMPLES 12 AND 13 AND COMPARATIVE EXAMPLE 5

A mixing reactor of a continuous type comprising a barrel having a section constituted of two partially overlapping circles of inner diameter of 80 mm and an effective length of 1.3 m and fitted with a jacket for passing a heating medium on the outer surface thereof and two rotating shafts fitted with many paddles engaging with each other provided in the inside of the barrel was used. Hot water of 80° C. was passed through the jacket, while the two rotating shafts were rotated in directions different from each other at a rate of 100 rpm. Trioxane containing 3.3% of 1,3-dioxolane was continuously fed to one end of the reactor at a rate of 10 kg/hr, while a catalyst given in Table 4 was continuously fed to the same end at such a rate as to give a predetermined concentration. Thus, the copolymerization was carried out. The reaction mixture discharged from the other end was immediately thrown into a 0.1% aqueous solution of triethylamine to deactivate the catalyst, followed by the drying of the obtained polymer. The characteristics of the resulting polymer are shown in Table 4. In this continuous polymerization as well as in the above-mentioned batch-wise polymerization using an autoclave, the copolymer prepared by the use of a heteropoly acid catalyst had an enhanced degree of polymerization and was improved in resistance to alkali and heat with the yield thereof being enhanced, even if the amount of the catalyst is very small, as compared with the one prepared by the use of boron trifluoride dibutyl etherate catalyst according to the prior art.

TABLE 4

| | Polymerization catalyst | Concentration* of catalyst (ppm) | Comonomer | Yield (%) | MI (g/10 min) | Degree of decomposition with alkali (%) | Weight loss on heating (%) |
|---|---|---|---|---|---|---|---|
| Example 12 | molybdophosphoric acid | 2 | 1,3-dioxolane | 75 | 4.8 | 2.1 | 2.2 |
| Example 13 | tungstosilicic acid | 2 | " | 74 | 4.9 | 2.2 | 2.3 |
| Comp. Ex. 5 | boron trifluoride butyl etherate | 40 | " | 68 | 6.8 | 3.8 | 4.0 |

*based on trioxane

We claim:

1. A process for the preparation of a normally solid, high molecular weight acetal polymer or copolymer, which process comprises polymerizing a principal monomer selected from anhydrous formaldehyde or a cyclic oligomer of formaldehyde, and optionally a comonomer polymerizable therewith, in the presence of between 0.1 to 5000 ppm, based on the total weight of said principal monomer and, optionally said comonomer, of a polymerization catalyst selected from heteropoly acids and acid salts of heteropoly acids.

2. A process as in claim 1, wherein said heteropoly acid is a compound represented by the formula:

$$H_x[M_m \bullet M'_n O_l \cdot y(H_2O)]$$

where M is at least one element selected from the group consisting of P, B, Si, Ge, Sn, As Sb, U, Mn, Re, Cu, Ni, Ti, Co, Fe, Cr, Th, and Ce; M' is at least one ligand element selected from the group consisting of W, Mo, V, and Nb; m is an integer from 1 to 60; n is an integer from 6 to 40; l is an integer from 10 to 100; x is an integer greater than 1; and y is an integer from 0 to 50.

3. A process as in claim 1, wherein said heteropoly acid is one containing W, Mo, or mixtures thereof as a ligand element.

4. A process as in claim 1, wherein said heteropoly acid is at least one selected from the group consisting of molybdosilicic acid, tungstosilicic acid, molybdophosphoric acid and tungstophosphoric acid.

5. A process as in any one of claims 1-4, wherein said principal monomer is trioxane.

6. A process as in any one of claims 1-4, wherein said principal monomer is trioxane, and said comonomer is a cyclic ether or a cyclic formal.

* * * * *

UNITED STATES PATENT AND TRADEMARK OFFICE
CERTIFICATE OF CORRECTION

PATENT NO. : 4,956,445

DATED : September 11, 1990

INVENTOR(S) : Yamamoto et al

It is certified that error appears in the above-identified patent and that said Letters Patent is hereby corrected as shown below:

Column 1, line 23, after "technique" delete "including" and insert --includes--
line 25, after "technique" delete "including" and insert --inlcudes--
line 58, after "of" insert --polymerization--;
line 67, after "polymer" delete "," and insert --(--.

Column 2, line 1, after "molecule" delete "." and insert --)-- and after "molecule)" insert --, the -- and delete "the";
line 6, after "copolymer" delete "copoly-";
line 7, delete "merization";
line 16, after "ends" insert --)--;
line 17, after "that" delete "a)";
line 42, after "enhanced" delete "the";
line 44, after "catalyst" insert --that-- and after "used" insert --is small--;
line 67, after "than" delete "that".

Column 4, line 12, after "organic," delete "solvents".

Column 5, line 27, after "may" delete "not" and insert --vary--.

Signed and Sealed this

Seventh Day of April, 1992

Attest:

HARRY F. MANBECK, JR.

*Attesting Officer*   *Commissioner of Patents and Trademarks*